United States Patent
Mueller

(10) Patent No.: US 8,468,802 B2
(45) Date of Patent: Jun. 25, 2013

(54) EXHAUST GAS SYSTEM

(75) Inventor: Michael Mueller, Nagold (DE)

(73) Assignee: Friedrich Boysen GmbH & Co. KG, Altensteig (DE)

(*) Notice: Subject to any disclaimer, the term of this patent is extended or adjusted under 35 U.S.C. 154(b) by 713 days.

(21) Appl. No.: 12/502,830

(22) Filed: Jul. 14, 2009

(65) Prior Publication Data
US 2010/0011751 A1 Jan. 21, 2010

(30) Foreign Application Priority Data
Jul. 21, 2008 (DE) .......................... 10 2008 033 984

(51) Int. Cl.
*F01N 3/00* (2006.01)
(52) U.S. Cl.
USPC ............... 60/286; 60/295; 60/301; 60/303; 60/322; 60/324
(58) Field of Classification Search
USPC ............... 60/286–288, 295, 297, 301, 303, 60/311, 322, 324
See application file for complete search history.

(56) References Cited

U.S. PATENT DOCUMENTS

| | | | | |
|---|---|---|---|---|
| 5,771,683 | A * | 6/1998 | Webb | 60/274 |
| 6,969,492 | B1 | 11/2005 | Goerigk et al. | |
| 7,509,799 | B2 * | 3/2009 | Amou et al. | 60/286 |
| 2003/0196425 | A1 | 10/2003 | Anderson | |
| 2008/0102010 | A1 | 5/2008 | Bruck et al. | |

FOREIGN PATENT DOCUMENTS

| | | |
|---|---|---|
| DE | 722 020 A | 6/1942 |
| DE | 2 211 775 A | 9/1973 |
| DE | 24 17 435 A | 10/1975 |
| DE | 2417435 | * 10/1975 |
| DE | 40 00 198 A | 10/1991 |
| DE | 198 55 093 A | 5/2000 |
| DE | 100 53 097 A1 | 5/2002 |
| DE | 102 41 898 A1 | 3/2004 |
| EP | 0 530 493 A2 | 3/1993 |
| EP | 1 054 139 A1 | 11/2000 |
| EP | 1 339 479 B1 | 9/2003 |
| EP | 1 451 461 B1 | 9/2004 |
| JP | 2002-256852 A | 9/2002 |
| JP | 2005-155404 A | 6/2005 |
| JP | 2007-146700 A | 6/2007 |
| JP | 2007-198316 A | 8/2007 |

OTHER PUBLICATIONS

European Search Report for European Patent Application No. 09 008 279.3, issued on Oct. 19, 2009, 3 pages and the English translation of the same, 4 pages.
Office Action issued in counterpart Japanese Application No. 2009-168672 dated Feb. 19, 2013 (4 pages) and an English translation of the same (3 pages).

* cited by examiner

*Primary Examiner* — Thomas Denion
*Assistant Examiner* — Diem Tran
(74) *Attorney, Agent, or Firm* — Fitch, Even, Tabin & Flannery, LLP

(57) ABSTRACT

An exhaust gas system for combustion engines is provided having at least one exhaust gas duct, in particular an exhaust pipe, and having an exhaust gas treatment device such as an oxidation catalyst, an SCR catalyst or a diesel particulate filter downstream of the exhaust gas duct, wherein, to improve the efficiency of downstream gas treatment devices, at least one secondary flow duct, in particular a secondary flow pipe, is provided in the exhaust gas duct with a cross-section reduced with respect to the exhaust gas duct which imparts coerced guidance of some of the exhaust gas flow differing from the actual exhaust gas flow.

19 Claims, 2 Drawing Sheets

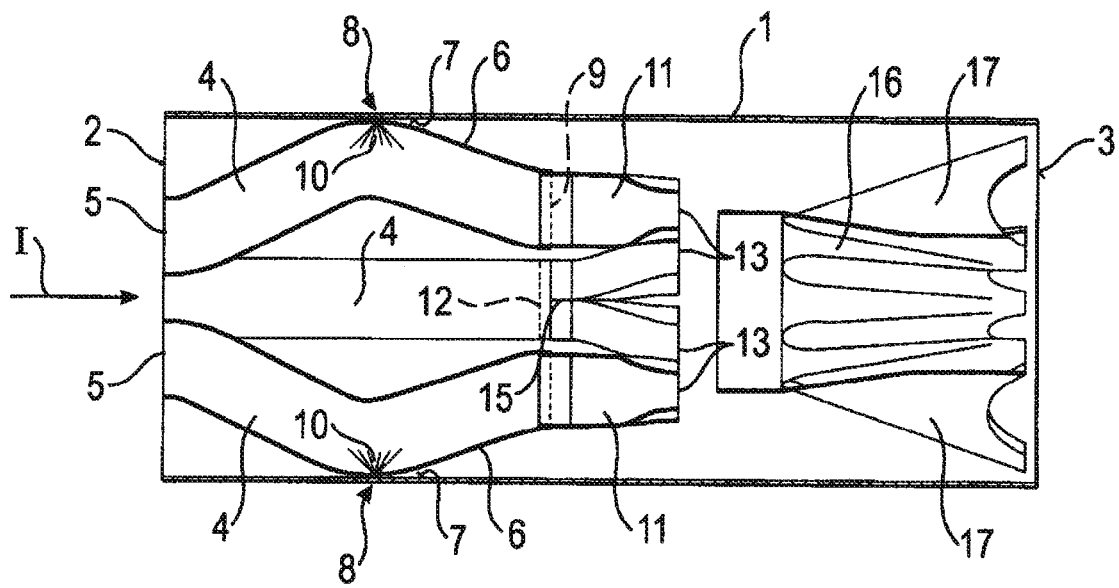
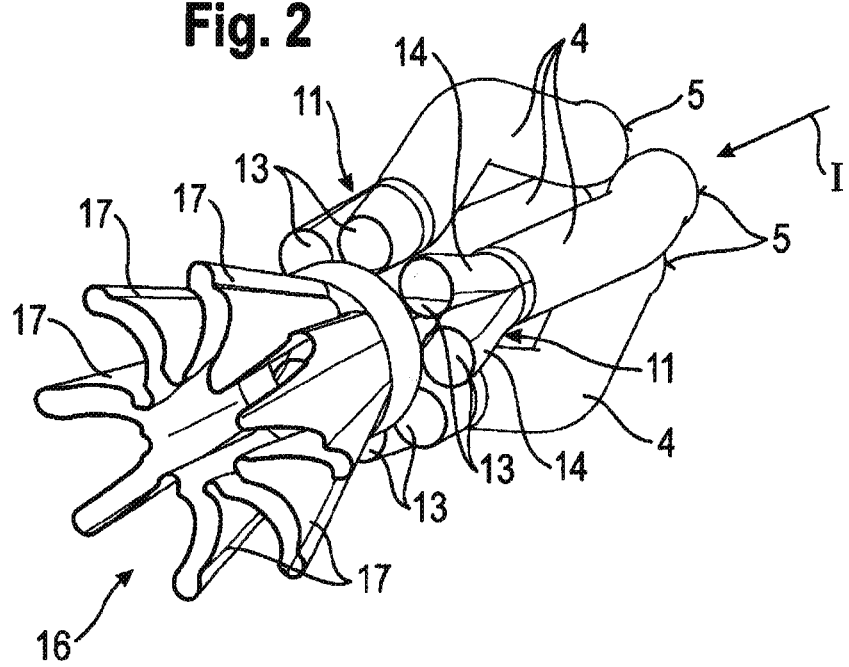

EXHAUST GAS SYSTEM

FIELD OF THE INVENTION

The present invention relates to an exhaust gas system for combustion engines having at least one exhaust duct, in particular an exhaust pipe, and an exhaust gas treatment device such as an oxidation catalyst, an SCR catalyst or a diesel particulate filter disposed downstream of the exhaust duct.

BACKGROUND OF THE INVENTION

Combustion engines emit an exhaust gas flow containing different kinds of pollutants into the atmosphere. Various apparatus for exhaust gas post-treatment have been developed to prevent the emission of pollutants. For example, catalysts are used for the conversion of harmful gaseous substances into harmless components and particulate filters are used for the capturing of unwanted solid particles. The exhaust tract of a diesel engine can, for example, be provided with an oxidation catalyst and a particulate filter arranged downstream thereof. Sooty particles, which are located in the exhaust gas flow are captured by the particulate filter and are stored in it. From a specific quantity onward, the collected soot has to be removed from the particulate filter so that the emission of exhaust gas is not prevented in too unacceptable a manner. This procedure is called regeneration.

The regeneration of the particulate filter in particular takes place by burning the soot, for which purpose a minimum temperature of the particulate filter is required. The exhaust gas temperature is, however, not sufficiently high in all operating states of the combustion engine. It is therefore also known to provide a burner in the exhaust tract by which the exhaust gas temperature can be raised to burn the soot in the particulate filter. It is also known to inject fuel into the exhaust gas which reacts exothermically in the oxidation catalyst and thereby heats the exhaust gas. However, a minimum temperature of the exhaust gas is also required for this since no exothermic reaction of the fuel in the oxidation catalyst takes place below a so-called light-off temperature.

Furthermore, nitrous oxide catalysts are used to reduce the nitrous oxides contained in the exhaust gas to nitrogen and water in a so-called selective catalytic reaction. These catalysts are therefore called SCR catalysts. In this respect, it is necessary to inject a reductant into the exhaust gas to achieve the selective catalytic reduction. A water/urea mixture is in particular used for this purpose whose urea decomposes in the exhaust gas to ammonia which reacts with the nitric oxides.

SUMMARY OF THE INVENTION

It is the underlying object of the invention to improve an exhaust gas system of the initially named kind with respect to its purification effect for the exhaust gas. The efficiency of the exhaust gas device should in particular be increased.

This object is satisfied with an exhaust gas system of the initially named kind in that at least one secondary flow duct, in particular a secondary flow pipe, is provided in the exhaust gas duct with a reduced cross-section with respect to the exhaust gas duct and imparting coerced guidance of some of the exhaust gas flow differing from the actual exhaust gas flow.

The invention is based on the recognition that the exhaust gas in the exhaust gas duct has different properties over the latter's cross-section. The exhaust gas is in particular much hotter at the center of the exhaust gas duct than in the peripheral regions. It can be achieved by a coerced guidance that hot exhaust gas moves from the center to the outside. This is, for example, advantageous when an input point, for example a fuel injection point or a reductant injection point, is provided at the exhaust gas duct. At least one secondary flow duct is then preferably guided to such an input point and the input into the secondary flow passage takes place. The fuel or the reductant is thereby input into the secondary flow of the exhaust gas which has a much higher temperature than the peripheral exhaust gas flow which would otherwise be in the region of the input point. The increased temperature of the secondary flow is also advantageous for the reductant input.

A further advantage of the coerced guidance is that a part gas flow can also be guided inwardly from the peripheral external region of the exhaust gas duct. This is important, for example, to flow centrally against a subsequent device, for example a downstream apparatus for the mixing of the exhaust gas flow to achieve a uniform temperature distribution.

A further advantage of the coerced guidance through at least one secondary flow duct is that the flow guidance is independent of the operating state of the combustion engine, in particular of its load level.

In accordance with a preferred embodiment of the invention, a plurality of secondary flow ducts are provided. The coerced guidance effect can thereby be amplified. The secondary flow ducts can in this respect be distributed evenly or unevenly over the diameter of the exhaust gas duct in dependence on the application.

In accordance with a further embodiment of the invention, one or more secondary flow ducts can be formed with simple or multiple branching viewed in the exhaust gas flow direction. A further division of the exhaust gas flow can take place by this branching. On the one hand, the exhaust gas flow can thereby be homogenized and, on the other hand, the exhaust gas flow can be aligned even more directly to a subsequent apparatus, for example to a downstream mixing device.

Furthermore, means for spin generation can be arranged in one or more secondary flow ducts, in particular before an input point for additives such as fuel or reductant. The exhaust gas is mixed by the spin generation device and the effect of the additive is thereby improved.

It is furthermore advantageous for specific applications if evaporation elements for liquid additives such as urea are arranged in one or more secondary flow ducts, in particular after an input point for such additives. The fine distribution of the additives in the exhaust gas flow can thus be further improved.

The coerced guidance can be further varied by inclination of the outlet end of at least one secondary flow duct with respect to the main exhaust gas flow direction. It is in particular possible to flow better against downstream devices.

A further improvement of the mixing can result in that a device for the generation of turbulence such as a vortex plate, a spin apparatus or the like is provided at the outlet end of at least one secondary flow duct. The mixing of the exhaust gas flow can thus be further increased and the effect of additives can be improved. The homogenization of the exhaust gas temperature can also thereby be improved.

Embodiments of the invention are shown in the drawings and will be described in the following. There are shown, schematically in each case.

BRIEF DESCRIPTION OF THE DRAWINGS

FIG. 1 a longitudinal section through a part of an exhaust gas system in accordance with the invention.

FIG. 2 a perspective view of the inner part of FIG. 1.

DETAILED DESCRIPTION OF THE PREFERRED EMBODIMENTS

Figure 3:
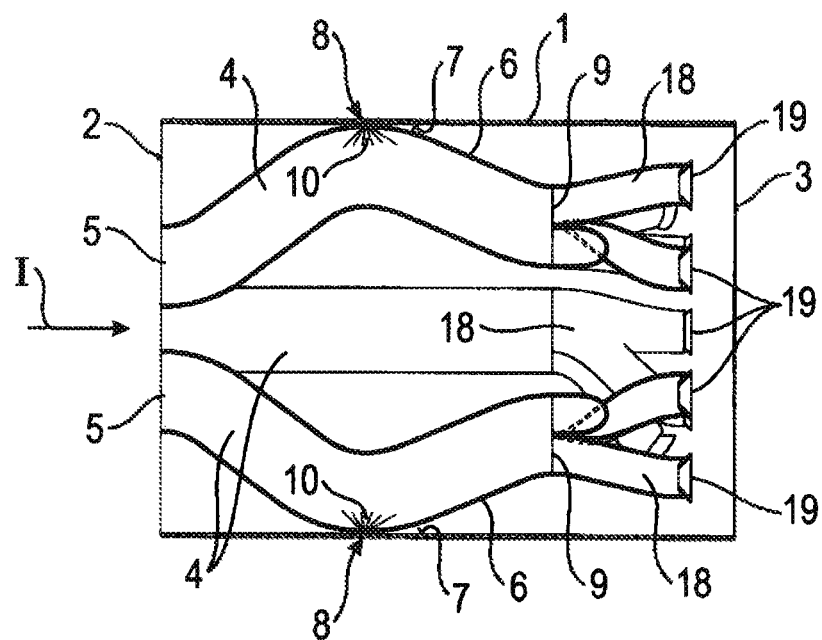
FIG. 3 a longitudinal section through a part of a variant of the exhaust gas system in accordance with the invention.

FIG. 1 shows a part of an exhaust pipe 1 of an exhaust gas system having an exhaust gas inflow side 2 and an exhaust gas outflow side 3. The section of an exhaust gas system in accordance with the invention shown in FIG. 1 can generally be provided at any desired point of the exhaust gas system; the arrangement is, however, preferred in front of an exhaust gas treatment device such as an oxidation catalyst, an SCR catalyst or a diesel particulate filter.

Four secondary flow pipes 4 whose exhaust gas inlet openings 5 are arranged in a central region of the cross-section of the exhaust pipe 1 are arranged in the interior of the pipe section 1 of FIG. 1. As can be recognized in FIG. 1, the secondary flow pipes 4 are, starting from their inlet openings 5, made radially outwardly curved and their wall 6 contacts the inner wall 7 of the exhaust pipe 1 in a contact region 8. Starting from the contact region 8, the secondary flow pipes 4 are led back, curved again, to the central region of the cross-section of the exhaust pipe 1 where they have their outlet openings.

Input points for additives such as injection points for fuel or reductant, such as urea, are provided in the contact region 8 of the secondary flow pipes 4 with the exhaust pipe 1. The injection is indicated by star-shaped lines 10.

As can in particular be recognized in FIG. 2, branch pipes 11 are inserted into the outlet ends 9 of the secondary flow pipes 4. The branch pipes 11 are made in this embodiment in the manner of a Y pipe which has an inlet opening 12 and two outlet openings 13. As shown in FIG. 1, the two part pipes 14 of the Y pipe 11 can be separated from the inlet opening 12 up to the outlet opening 13 by a wall 15.

A mixing device 16 is arranged in the exhaust pipe 1 on the side of the secondary flow pipes 4 on the side remote from the exhaust gas flow. Said mixing device is made in the manner of a jet nozzle mixer such as is used for jet engines and is described in EP 1 451 461 B 1. The exhaust gas flow in the exhaust pipe 1 is mixed over its cross-section by the mixing device 16 so that the different temperatures balance, in particular between the central region and the peripheral region of the exhaust gas flow. As can be recognized in FIG. 2, in this respect the outlet openings 13 of the branch pipes 11 of the secondary flow pipes 4 are arranged such that they are ideally incident onto the mixer surfaces 17 of the mixing device 16. A particularly good mixing of the exhaust gas flow is thereby achieved.

As initially explained, a coerced guidance of some of the exhaust gas flow flowing in the exhaust pipe 1 in accordance with the arrow I is achieved by the secondary flow pipes 4. The part gas flows are first guided to the input points 8, where additives are input into the secondary gas flows. The part exhaust gas flows are guided back from these input points 8 to the central region of the exhaust pipe 1 and are aligned ideally with respect to the downstream mixing device 16. In this respect, the alignment is promoted, as described, by the branch pipes 11. A homogenized exhaust gas flow with well-distributed additives thus emerges on the side of the mixing device remote from the exhaust gas flow. This exhaust gas flow can then in particular be supplied to an oxidation catalyst, to an SCR catalyst or to a diesel particulate filter. A high effect of this downstream exhaust gas treatment results from the good mixing of the exhaust gas flow with the additives.

Figure 4:
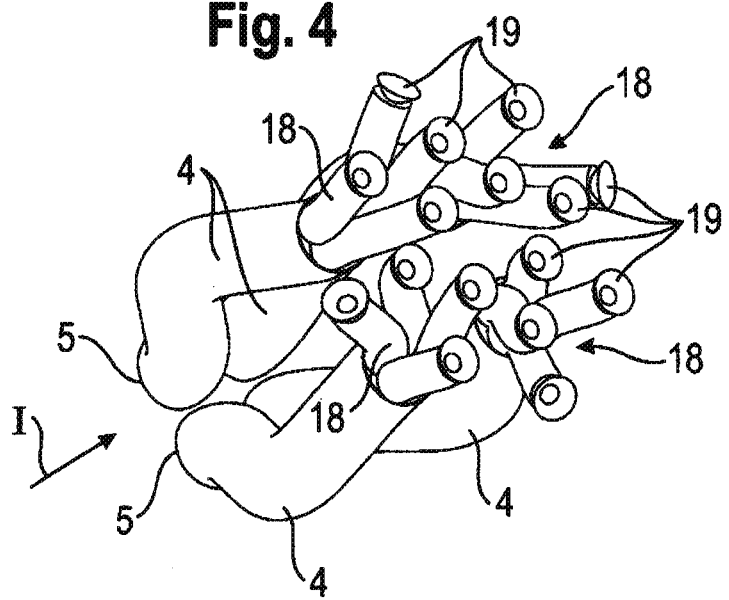
FIG. 4 a perspective view of the inner part of FIG. 3.

The variant shown in FIGS. 3 and 4 largely coincides with respect to the secondary flow pipes 4 with the variant of FIG. 1. Starting from their exhaust gas inlet openings 5, the secondary flow pipes 4 are also first radially outwardly curved to contact regions 8 with the exhaust pipe 1 here and are guided from there, likewise curved, radially inwardly back to their exhaust gas outlet openings 9. Unlike the variant of FIGS. 1 and 2, in the variant of FIGS. 3 and 4, branch pipes 18 which each have four outlet openings 19 are inserted into the exhaust gas outlet openings 9. The outlet openings 19 of the branch pipes 18 are arranged such that a distribution and mixing of the emerging exhaust gas flow over the total cross-section of the exhaust pipe 1 results which is as uniform as possible. Due to this distribution and mixing of the exhaust gas flow through the branch pipes 18, a downstream mixing device can be dispensed with in this variant.

The operation of the second variant corresponds to that of the first variant. Here, too, starting from the inlet openings 5 of the secondary flow pipes 4, some of the exhaust gas flow is force guided radially outwardly where additives can be input and from there is guided back radially inwardly from where the exhaust gas flow is distributed via the branch pipes 18. The distributed and mixed exhaust gas flow with the additives can then again be supplied to a downstream exhaust gas treatment device.

An improved exhaust gas treatment with a high efficiency thus results by the exhaust gas system in accordance with the invention.

What is claimed is:

1. An exhaust gas system for combustion engines having at least one exhaust gas duct, in particular an exhaust pipe, and having an exhaust gas treatment device downstream of the exhaust gas duct, wherein at least one secondary flow duct, in particular a secondary flow pipe, is provided in and completely arranged within the exhaust gas duct with a cross-section reduced with respect to the exhaust gas duct, wherein the secondary flow duct imparts coerced guidance of some of the exhaust gas flow differing from an actual exhaust gas flow so that a flow direction of the exhaust flow through the secondary flow duct differs from a main exhaust gas flow direction of the actual exhaust gas flow surrounding the secondary flow duct, and wherein the secondary flow duct is made and arranged such that a part exhaust gas flow is guided radially inwardly to the central region of the exhaust gas duct.

2. An exhaust gas system in accordance with claim 1, characterized in that the secondary flow duct is made and arranged such that the part exhaust gas flow is guided radially outwardly from the central region of the exhaust gas duct before the part exhaust gas flow is guided radially inwardly to the central region of the exhaust gas duct.

3. An exhaust gas system in accordance with claim 1, characterized in that a part gas flow is guided to a peripheral input point, in particular to a fuel or reductant injection point, or to a burner.

4. An exhaust gas system in accordance with claim 1, characterized in that an apparatus for the mixing of the exhaust gas, in particular a jet nozzle mixer, is arranged downstream of the exhaust gas of the secondary flow duct.

5. An exhaust gas system in accordance with claim 1, characterized in that one or more secondary flow ducts are formed with simple or multiple branching in the exhaust gas flow direction.

6. An exhaust gas system in accordance with claim 1, characterized in that a plurality of secondary flow ducts is manufactured in form of an insert which is inserted into the exhaust gas duct.

7. An exhaust system in accordance with claim 1, characterized in that the exhaust gas treatment device is an oxidation catalyst, a SCR catalyst or a diesel particulate filter.

8. An exhaust gas system in accordance with claim 1, characterized in that means for spin generation are arranged in one or more secondary flow ducts, in particular before an input point for additives.

9. An exhaust gas system in accordance with claim 8, characterized in that the input point for additives is an input point for fuel or reductant.

10. An exhaust gas system in accordance with claim 1, characterized in that evaporation elements for liquid additives are arranged in one or more secondary flow ducts, in particular after an input point for the additives.

11. An exhaust gas system in accordance with claim 10, characterized in that the evaporation elements for liquid additives are evaporation elements for urea.

12. An exhaust gas system in accordance with claim 1, characterized in that a device for the generation of turbulence is provided at the outlet end of at least one secondary flow duct.

13. An exhaust gas system in accordance with claim 12, characterized in that the device for the generation of turbulence is a vortex plate or a spin apparatus.

14. An exhaust system for combustion engines having at least one exhaust gas duct, in particular an exhaust pipe, and having an exhaust gas treatment device downstream of the exhaust gas pipe, wherein at least one secondary flow duct, in particular a secondary flow pipe, is provided in and completely arranged within the exhaust gas duct with a cross-section reduced with respect to the exhaust gas duct, wherein the secondary flow duct imparts coerced guidance of some of the exhaust gas flow differing from an actual exhaust gas flow so that a flow direction of the exhaust gas flow through the secondary flow pipe differs from a main exhaust gas flow direction of the actual exhaust gas flow surrounding the secondary flow duct, and
  wherein a plurality of secondary flow ducts are arranged distributed evenly over the cross-section of the exhaust gas duct.

15. An exhaust system in accordance with claim 14, characterized in that the exhaust gas treatment device is an oxidation catalyst, a SCR catalyst or a diesel particulate filter.

16. An exhaust system for combustion engines having at least one exhaust gas duct, in particular an exhaust pipe, and having an exhaust gas treatment device downstream of the exhaust gas pipe, wherein at least one secondary flow duct, in particular a secondary flow pipe, is provided in and completely arranged within the exhaust gas duct with a cross-section reduced with respect to the exhaust gas duct, wherein the secondary flow duct imparts coerced guidance of some of the exhaust gas flow differing from an actual exhaust gas flow so that a flow direction of the exhaust gas flow through the secondary flow pipe differs from a main exhaust gas flow direction of the actual exhaust gas flow surrounding the secondary flow duct, and
  wherein a plurality of secondary flow ducts are arranged distributed unevenly over the cross-section of the exhaust gas duct.

17. An exhaust system in accordance with claim 16, characterized in that the exhaust gas treatment device is an oxidation catalyst, a SCR catalyst or a diesel particulate filter.

18. An exhaust system for combustion engines having at least one exhaust gas duct, in particular an exhaust pipe, and having an exhaust gas treatment device downstream of the exhaust gas pipe, wherein at least one secondary flow duct, in particular a secondary flow pipe, is provided in and completely arranged within the exhaust gas duct with a cross-section reduced with respect to the exhaust gas duct, wherein the secondary flow duct imparts coerced guidance of some of the exhaust gas flow differing from an actual exhaust gas flow so that a flow direction of the exhaust gas flow through the secondary flow pipe differs from a main exhaust gas flow direction of the actual exhaust gas flow surrounding the secondary flow duct, and wherein the outlet end of the at least one secondary flow duct is inclined toward the main exhaust gas flow direction.

19. An exhaust system in accordance with claim 18, characterized in that the exhaust gas treatment device is an oxidation catalyst, a SCR catalyst or a diesel particulate filter.

* * * * *